(12) United States Patent
Hopson et al.

(10) Patent No.: US 11,149,797 B2
(45) Date of Patent: Oct. 19, 2021

(54) SEMI-CYLINDRICAL/SEMI-SPHERICAL INNER SURFACE OF AN OUTER RACE AND A BALL CAGE FOR A FIXED CONSTANT VELOCITY JOINT

(71) Applicant: NEAPCO INTELLECTUAL PROPERTY HOLDINGS, LLC, Farmington Hills, MI (US)

(72) Inventors: Michael Hopson, Clinton Township, MI (US); Richard Seidel, Macomb, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 376 days.

(21) Appl. No.: 16/211,484

(22) Filed: Dec. 6, 2018

(65) Prior Publication Data

US 2019/0178297 A1    Jun. 13, 2019

Related U.S. Application Data

(60) Provisional application No. 62/596,360, filed on Dec. 8, 2017.

(51) Int. Cl.
*F16D 3/223* (2011.01)
*F16D 3/2237* (2011.01)

(52) U.S. Cl.
CPC .. *F16D 3/2237* (2013.01); *F16D 2003/22303* (2013.01); *Y10S 464/906* (2013.01)

(58) Field of Classification Search
CPC ......... F16D 3/2237; F16D 2003/22303; Y10S 464/906
USPC .................................................. 464/145, 144
See application file for complete search history.

(56) References Cited

U.S. PATENT DOCUMENTS

| | | | | |
|---|---|---|---|---|
| 2,150,952 A | * | 3/1939 | Ward ................... | B60K 17/165 464/906 |
| 2,322,570 A | * | 6/1943 | Dodge .................. | F16D 3/2265 464/145 |
| 4,950,206 A | * | 8/1990 | Jacob .................... | F16D 3/2233 464/145 |
| 6,497,622 B1 | * | 12/2002 | Bilz ........................ | F16D 3/223 464/144 |

OTHER PUBLICATIONS

Universal Joint and Driveshaft Design Manual, AE-7, Society of Automotive Engineers, Inc., Warrendale, PA, Section 3.2.12, TJ1079. S62. (Year: 1979).*

* cited by examiner

*Primary Examiner* — Greg Binda
(74) *Attorney, Agent, or Firm* — Shumaker, Loop & Kendrick, LLP; James D. Miller

(57) ABSTRACT

A constant velocity joint assembly includes an outer race having a first bore defined by an inner surface of the outer race. A ball cage has an outer surface and a second bore defined by an inner surface of the ball cage. The ball cage is axially received in the first bore of the outer race. At least one of the inner surface of the outer race or the inner surface the ball cage includes a first portion having a cylindrical contour and a second portion having a spherical contour.

20 Claims, 3 Drawing Sheets

SEMI-CYLINDRICAL/SEMI-SPHERICAL INNER SURFACE OF AN OUTER RACE AND A BALL CAGE FOR A FIXED CONSTANT VELOCITY JOINT

CROSS REFERENCE TO RELATED APPLICATIONS

This patent application claims the benefit of U.S. Provisional Application No. 62/596,360 filed on Dec. 8, 2017, the entire disclosure of which is hereby incorporated herein by reference.

FIELD OF THE INVENTION

The invention relates to a constant velocity joint of a drive shaft assembly, and more particularly to a configuration of an outer race, a ball cage, and an inner race of the constant velocity joint.

BACKGROUND OF THE INVENTION

Constant velocity (CV) joints allow a drive shaft to transmit power through a variable angle during rotation of the drive shaft without an appreciable increase in friction or play. CV joints typically include an outer race having an inner surface with ball tracks and an inner race having an outer surface with ball tracks corresponding to the ball tracks of the outer race. A ball cage is disposed between the outer race and the inner race and has a plurality of apertures formed therein. A plurality of balls is received in the apertures of the ball cage and the ball tracks of each of the inner race and the outer race.

Typical 6-ball fixed CV joints include all six of the balls received in the ball cage disposed along a joint center of the CV joint in a manner wherein axial loads on the CV joint must be accounted for to prevent the CV joint from disassembling during use thereof. The inner surface of the outer race, the outer surface of the ball cage, the inner surface of the ball cage, and the outer surface of the inner race may all include a spherical contour to compensate for the axial loads generated when the CV joint is in use. The axial loads may be caused by an angular displacement between the inner race and the outer race or by the torque delivered to the CV joint by the drive shaft assembly. The spherical contours aid in providing an interference fit between the different surfaces to avoid disassembly of the CV joint.

An 8-ball fixed CV joint allows for the ball tracks in each of the inner race and the outer race to be alternatingly offset relative to the joint center of the CV joint in a manner wherein the axial loads experienced by the CV joint are preferably cancelled out. The ability of the 8-ball fixed CV joint to compensate for the axial loads allows for the 8-ball fixed CV joint to be formed in the absence of the spherically contoured surfaces normally used to maintain the structure of the typical 6-ball CV joint.

In order to take advantage of the 8-ball fixed CV joint with alternating offsets, both the spherical inner surface of the ball cage and the spherical inner surface of the outer race may be replaced with cylindrical surfaces devoid of a spherical contour. The use of a cylindrical surface advantageously allows for a clearance to be formed between the inner race and the ball cage and the ball cage and the outer race. The existence of a clearance allows for an ease of axial insertion of the inner race into the ball cage and the ball cage into the outer race.

However, one problem presented by this configuration includes the inability to establish an axial positioning of a joint center of the ball cage relative to a joint center of either of the inner race or the outer race. The inability to establish such axial positions is due to the lack of structure constraining the axial positioning of the inner race, the ball cage, and the outer race relative to each other. The alignment of the joint centers of the different components is necessary to properly articulate the inner race relative to the ball cage and the ball cage relative to the outer race during assembly of the CV joint. The alignment of the joint centers is very difficult to accomplish only through operator feel and becomes especially cumbersome if additional fixtures and the like must be used to properly position the components for aligning the joint centers.

It would therefore be desirable to produce a CV joint that allows for an ease of axial assembly while also reliably establishing a positioning of joint centers of an inner race, a ball cage, and an outer race relative to each other during a manufacturing process of the CV joint.

SUMMARY OF THE INVENTION

In accordance and attuned with the present invention, a CV joint that allows for an ease of axial assembly while also reliably establishing a positioning of joint centers of an inner race, a ball cage, and an outer race relative to each other during a manufacturing process of the CV joint has surprisingly been discovered.

According to an embodiment of the disclosure, a constant velocity joint assembly includes an outer race having a first bore defined by an inner surface of the outer race. A ball cage has an outer surface and a second bore defined by an inner surface of the ball cage. The ball cage is axially received in the first bore of the outer race. At least one of the inner surface of the outer race or the inner surface the ball cage includes a first portion having a cylindrical contour and a second portion having a spherical contour.

According to another embodiment of the disclosure, a constant velocity joint assembly includes an outer race having a first bore defined by an inner surface of the outer race. The inner surface includes a first portion having a cylindrical contour and a second portion having a spherical contour. The constant velocity joint assembly further includes a ball cage having an outer surface and a second bore defined by an inner surface of the ball cage. The ball cage is axially received in the first bore of the outer race. The outer surface of the ball cage has a spherical contour and the inner surface of the ball cage includes a first portion having a cylindrical contour and a second portion having a spherical contour. The constant velocity joint assembly also includes an inner race having an outer surface with a spherical contour. The inner race is axially received in the second bore of the ball cage.

According to yet another embodiment of the disclosure, a constant velocity joint assembly includes an outer race having a first bore defined by an inner surface of the outer race. The inner surface includes a first portion having a cylindrical contour and a second portion having a spherical contour. A ball cage has an outer surface and a second bore defined by an inner surface of the ball cage. The ball cage is axially inserted into the first bore of the outer race. The outer surface of the ball cage nests within the second portion of the inner surface of the outer race, wherein a substantially equal first clearance is formed intermediate the outer surface of the ball cage and the first portion of the inner surface of the outer race and the outer surface of the ball cage and the second portion of the inner surface of the outer race. The inner surface of the ball cage includes a first portion having a cylindrical contour and a second portion having a spherical contour. The constant velocity joint assembly further includes an inner race having an outer surface. The inner race nests within the second portion of the inner surface of the ball cage, wherein a substantially equal second clearance is formed intermediate the outer surface of the inner race and the first portion of the inner surface of the ball cage and the outer surface of the inner race and the second portion of the inner surface of the ball cage.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, substantially is defined as "to a considerable degree" or "proximate" or as otherwise understood by one ordinarily skilled in the art. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters. Where any conflict or ambiguity may exist between a document incorporated by reference and this detailed description, the present detailed description controls. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
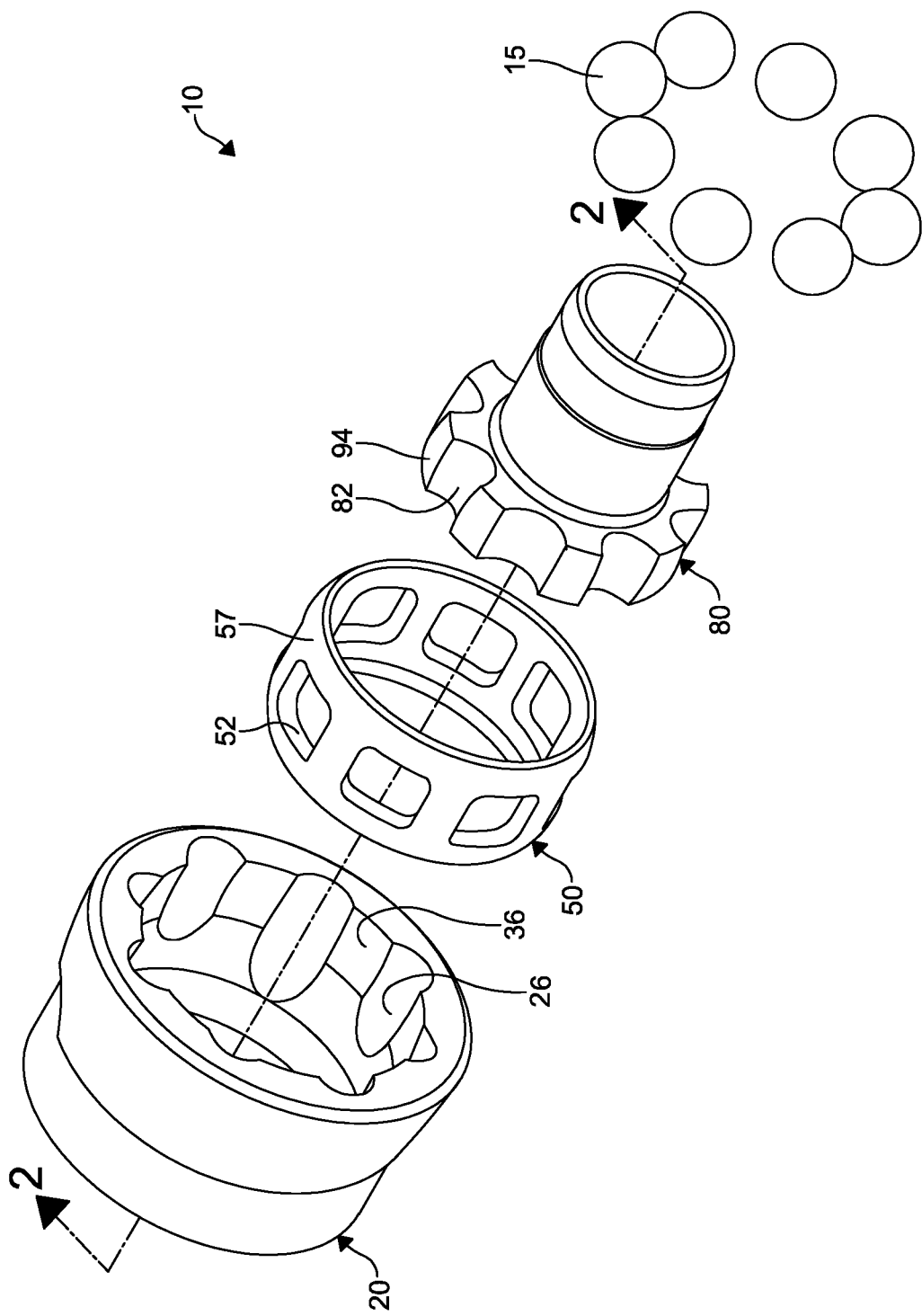
FIG. 1 is an exploded top perspective view of a constant velocity joint according to an embodiment of the disclosure.

FIG. 1 illustrates a constant velocity (CV) joint assembly 10 according to one embodiment of the invention. The CV joint assembly 10 includes an outer race 20, a ball cage 50, and an inner race 80. The outer race 20 receives the ball cage 50 therein and the ball cage 50 receives the inner race 80 therein. An annular array of ball apertures 52 is formed through the ball cage 50. Each of the ball apertures 52 is configured to receive a respective ball 15 of the CV joint assembly 10. Each of the balls 15 received in the ball cage 50 is further received within corresponding axially extending ball tracks 26, 82 formed in each of the outer race 20 and the inner race 80. However, in other embodiments, the outer race 20 and the inner race 80 can be without the respective tracks 26, 82. The balls 15 permit relative rotational movement between the outer race 20 and the ball cage 50 and the inner race 80. As illustrated, the CV joint assembly 10 is configured as an 8-ball fixed CV joint. However, it is understood the CV joint assembly 10 can be configured as a 6-ball fixed CV joint or other CV joint with any number of balls. Additionally, certain features and concepts of the present disclosure can be configured with or adapted for other types of CV joint assemblies.

Figure 2:
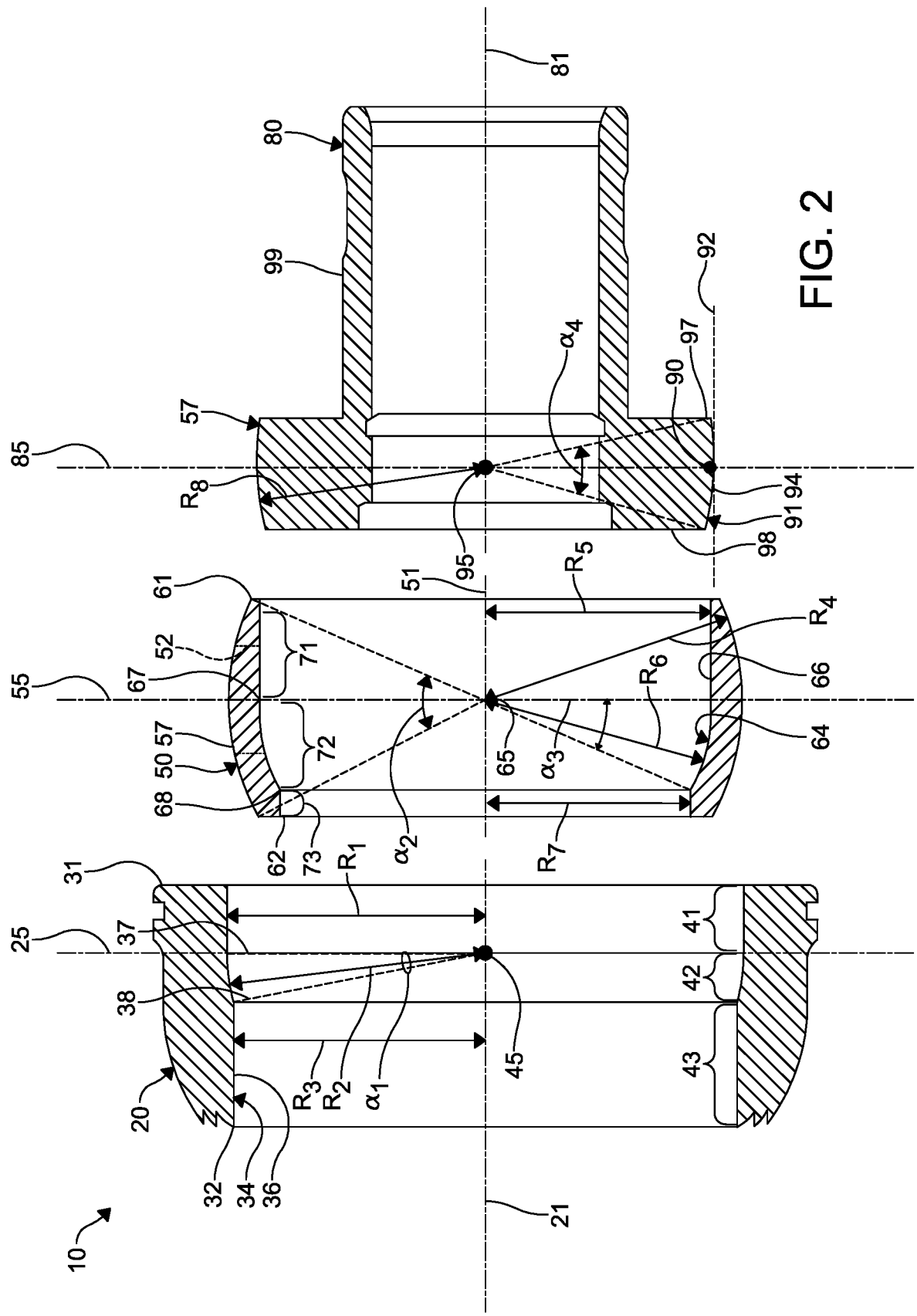
FIG. 2 is an exploded cross-sectional elevational view of an outer race, a ball cage, and an inner race of the constant velocity joint assembly of FIG. 1 taken through line 2-2, wherein the cross-section is taken diametrically through the constant velocity joint at a portion thereof not including windows or tracks.
Figure 3:
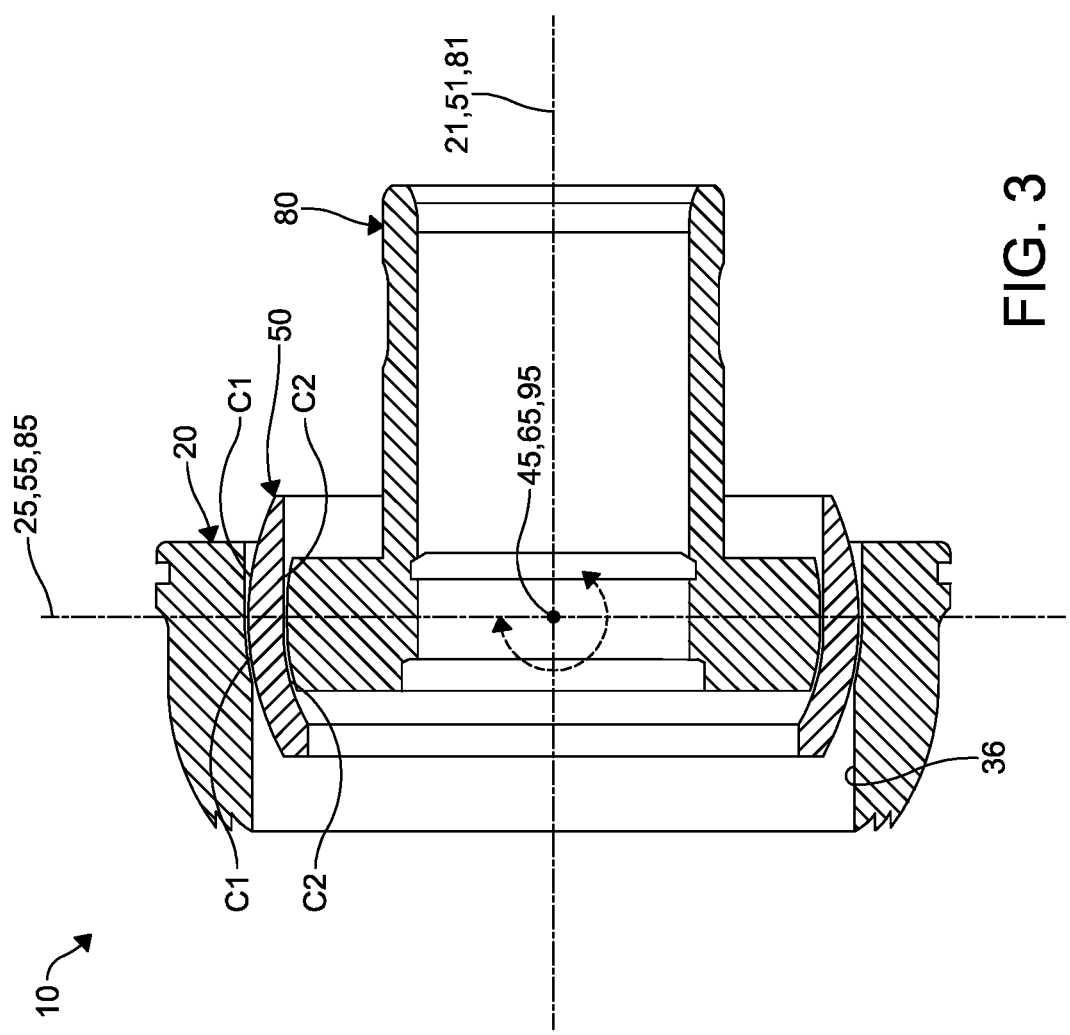
FIG. 3 is an assembled cross-sectional elevational view of the outer race, the ball cage, and the inner race of FIG. 2, wherein the ball cage is nested within the outer race following axial insertion of the ball cage into the outer race and the inner race is nested within the ball cage following axial insertion of the inner race into the ball cage.

Cross-sectional views of the outer race 20, the ball cage 50, and the inner race 80 are illustrated in FIGS. 2-3. The ball apertures 52, illustrated with hidden dotted lines for reference, of the ball cage 50 and the respective tracks 26, 82 are not illustrated for convenience. Each of the outer race 20, the ball cage 50, and the inner race 80 includes a respective joint center plane 25, 55, 85 (a first joint center plane 25, a second joint center plane 55, a third joint center plane 85) arranged normal to a respective central axis 21, 51, 81 (a first central axis 21, a second central axis 51, a third central axis 81) of each respective one of the outer race 20, the ball cage 50, and the inner race 80. The joint center planes 25, 55, 85 are configured to be arranged substantially co-planar with each other when the CV joint assembly 10 is fully assembled and when the central axes 21, 51, 81 of each one of the outer race 20, the ball cage 50, and the inner race 80 are in substantial alignment with each other.

The outer race 20 includes the first central axis 21 arranged normal to a first joint center plane 25. The outer race 20 extends in the axial direction thereof from a first end 31 to an oppositely arranged second end 32 thereof. As shown in FIGS. 2-3, the first joint center plane 25 is not equally spaced from each of the first end 31 and the second end 32 of the outer race 20. However, in an alternate embodiment, the first joint center plane 25 can be unequally equally spaced from each of the first end 31 and the second end 32 of the outer race 20.

The outer race 20 includes a bore 34 extending in there axial direction thereof from the first end 31 to the second end 32 thereof. The bore 34 is defined by an inner surface 36 of the outer race 20. The inner surface 36 of the bore 34 includes a first portion 41, a second portion 42, and a third portion 43.

The first portion 41 of the inner surface 36 of the bore 34 extends from the first end 31 of the outer race 20 to the second portion 42. The first portion 41 is substantially cylindrical in contour in a manner wherein an entirety of the first portion 41 has a substantially constant first radial distance $R_1$ along a direction of the first central axis 21 of the outer race 20, wherein the first radial distance $R_1$ is measured from the first central axis 21 to the inner surface 36 in a direction perpendicular to the first central axis 21.

The second portion 42 of the inner surface 36 of the bore 34 is formed intermediate the first portion 41 and the third portion 43 of the inner surface 36. The first joint center plane 25 forms a boundary between the first portion 41 and the second portion 42. The second portion 42 has a spherical contour extending tangentially from an end of the cylindrically contoured first portion 41. The second portion 42 includes an entirety thereof having a substantially constant second radial distance $R_2$ along the direction of the first central axis 21 of the outer race 20, wherein the second radial distance $R_2$ is measured from a first joint center point 45 to the second portion 42 of the inner surface 36. The first joint center point 45 is disposed at an intersection of the first central axis 21 and the first joint center plane 25. As shown, a first end 37 of the second portion 42 may be angularly displaced from an opposing second end 38 of the second portion 42 with respect to the first joint center point 45 by a first angle $\alpha_1$. The first angle $\alpha_1$ is in a range of about 10-20 degrees, for example. However, the first angle $\alpha_1$ can be an angle greater than 20 degrees or less than 10 degrees if desired or depending on the configuration of the ball cage 50. The first radial distance $R_1$ as measured in the direction perpendicular to the first central axis 21 is equal to the second radial distance $R_2$ as measured from the first joint center point 45.

The third portion 43 extends from the second end 32 of the outer race 20 to the second portion 42 and is substantially cylindrical in contour in a manner wherein an entirety of the third portion 43 has a substantially constant third radial distance $R_3$ along the direction of the first central axis 21 of the outer race 20, wherein the third radial distance $R_3$ is measured from the first central axis 21 to the third portion 43 of the inner surface 36 in a direction perpendicular to the first central axis 21. The third radial distance $R_3$ is less than each of the first radial distance $R_1$ and the second radial distance $R_2$.

The ball cage 50 includes the second central axis 51 arranged normal to the second joint center plane 55. The ball cage 50 extends in the axial direction thereof from a first end 61 to an oppositely arranged second end 62 thereof. The second joint center plane 55 may pass through a center of the annular array of ball apertures 52 (represented in FIG. 2 with dashed hidden lines) with respect to the second central axis 51.

The ball cage 50 includes an outer surface 57 having a substantially spherical contour. The outer surface 57 includes an entirety thereof having a substantially constant fourth radial distance $R_4$ along a direction of the second central axis 51, wherein the fourth radial distance $R_4$ is measured from a second joint center point 65 disposed at an intersection of the second central axis 51 and the second joint center plane 55. As shown, the first end 61 of the outer surface 57 of the ball cage 50 may be angularly displaced from the second end 62 of the outer surface 57 thereof with respect to the joint center point 65 by a second angle $\alpha_2$ in a range of about 40-60 degrees, as one non-limiting example. However, it is understood the second angle $\alpha_2$ can be less than 40 degrees or greater than 60 degrees, if desired.

The ball cage 50 includes a bore 64 extending axially from the first end 61 to the second end 62 thereof. The bore 64 is defined by an inner surface 66 of the ball cage 50 including a first portion 71, a second portion 72, and a third portion 73.

The first portion 71 of the inner surface 66 extends from the first end 61 of the ball cage 50 to the second portion 72 of the inner surface 66 of the ball cage 50. The first portion 71 is substantially cylindrical in contour in a manner wherein an entirety of the first portion 71 has a substantially constant fifth radial distance $R_5$ along a direction of the second central axis 51, wherein the fifth radial distance $R_5$ is measured from the second central axis 51 to the first portion 71 in a direction perpendicular to the second central axis 51.

The second portion 72 of the inner surface 66 is formed intermediate the first portion 71 and the third portion 73 thereof. The second joint center plane 55 forms a boundary between the first portion 71 and the second portion 72. The second portion 72 has a spherical contour extending tangentially from an end of the first portion 71. The second portion 72 includes an entirety thereof having a substantially constant sixth radial distance $R_6$ along the direction of the second central axis 51, wherein the sixth radial distance $R_6$ is measured from the second portion 72 to the second joint center point 65. As shown, a first end 67 of the second portion 72 may be angularly displaced from an opposing second end 68 of the second portion 72 with respect to the second joint center point 65 by a third angle $\alpha_3$ in a range of about 10-30 degrees, as one non-limiting example. However, it is understood, the third angle $\alpha_3$ can be less than 10 degrees or greater than 30 degrees, if desired. The fifth radial distance $R_5$ is equal to the sixth radial distance $R_6$.

The third portion 73 of the inner surface 66 extends from the second end 62 of the ball cage 50 to the second portion 72 and is substantially cylindrical in contour. An entirety of the third portion 73 has a substantially constant seventh radial distance $R_7$ along the direction of the second central axis 51, wherein the seventh radial distance $R_7$ is measured from the third portion 73 to the second central axis 51 in a direction perpendicular to the second central axis 51. The seventh radial distance $R_7$ is less than each of the fifth radial distance $R_5$ and the sixth radial distance $R_6$.

The fourth radial distance $R_4$ is substantially similar to, but slightly less than, each of the first radial distance $R_1$ and the second radial distance $R_2$. As used herein, "slightly less" is used in terms as would be typically used to describe clearances and means "substantially equal to but marginally less than" in order to accomplish the mechanical or structural relationship between the respective components. The fourth radial distance $R_4$ being slightly less than each of the first radial distance $R_1$ and the second radial distance $R_2$ creates a substantially equal clearance $C_1$ (FIG. 3) between the outer surface 57 of the ball cage 50 and each of the first portion 41 and the second portion 42 of the inner surface 36 of the outer race 20 when the first joint center plane 25 of the outer race 20 is arranged co-planar with the second joint center plane 55 of the ball cage 50. The clearance $C_1$ may be relatively small in comparison to the radial distances $R_1$-$R_7$ discussed with reference to each of the outer race 20 and the ball cage 50 and may be selected based on the manufacturing tolerances used for forming each component. The clearance $C_1$ may be about 30 microns, as one non-limiting example. However, the clearance may be less than or greater than 30 microns in other examples.

More specifically, the clearance $C_1$ between the outer surface 57 of the ball cage 50 and the first portion 41 of the inner surface 36 of the outer race 20 allows for the ball cage 50 to be axially inserted into the bore 34 of the outer race 20 when the first central axis 21 is aligned with the second central axis 51. The ball cage 50 is axially inserted into the bore 34 until the spherically contoured outer surface 57 thereof abuts the spherically contoured second portion 42 of the inner surface 36 of the outer race 20. The existence of the clearance $C_1$ allows for the outer surface 57 of the ball cage 50 to nest in the second portion 42 of the inner surface 36 of the outer race 20 while allowing for enough clearance for the ball cage 50 to be rotated about an axis perpendicular to the second central axis 51 of the ball cage 50. For example, the ball cage 50 may be rotated (in a direction indicated by the dashed arrow) about the second joint center point 65 as viewed from the perspective of FIG. 3 while maintaining the clearance $C_1$ between the outer surface 57 of the ball cage 50 and the second portion 42 of the inner surface 36 of the outer race 20 without having to alter the axial position of the second joint center point 65 of the ball cage 50 relative to the outer race 20. This relationship allows for the ball cage 50 to be rotated relative to the second joint center point 65 to expose the apertures 52 of the ball cage 50 for reception of the balls 15 therein. As a result, the balls 15 may be received into the ball apertures 52 in a radially inward direction relative to the second joint center point 45.

The inner race 80 includes the third central axis 81 arranged normal to the third joint center plane 85. The third joint center plane 85 passes through a ball cage engaging portion 91 of the inner race 80. The ball cage engaging portion 91 includes an outer surface 94 having a substantially spherical contour. The third joint center plane 85 intersects a point 90 of the outer surface 94. A line 92 extending tangential to the outer surface 94 at the point 90 is parallel to the third central axis 81. The point 90 is spaced at a maximum distance on the outer surface 94 from the third central axis 81 when measured in a direction perpendicular to the third central axis 81. The outer surface 94 includes an entirety thereof having a substantially constant eighth radial distance $R_8$ along a direction of the third central axis 81, wherein the eighth radial distance $R_8$ is measured from the outer surface 94 to a third joint center point 95 disposed at an intersection of the third central axis 81 and the third joint center plane 85. A first end 97 of the ball cage engaging portion 91 may be angularly displaced from a second end 98 thereof with respect to the third joint center point 95 by a fourth angle $\alpha_4$ in a range of about 10-30 degrees, as one non-limiting example. However, it is understood the fourth angle $\alpha_4$ can be greater than 30 degrees or less than 10 degrees, if desired.

The eighth radial distance $R_8$ is substantially similar to, but slightly less than, each of the fifth radial distance $R_5$ and the sixth radial distance $R_6$. The eighth radial distance $R_8$ being slightly less than each of the fifth radial distance $R_5$ and the sixth radial distance $R_6$ creates a substantially equal clearance $C_2$ (FIG. 3) between the outer surface 94 of the inner race 80 and each of the first portion 71 and the second portion 72 of the inner surface 66 of the ball cage 50 when the second joint center plane 55 of the ball cage 50 is arranged co-planar with the third joint center plane 85 of the inner race 80. The clearance $C_2$ may be relatively small in comparison to the radial distances $R_4$-$R_8$ discussed with reference to each of the ball cage 50 and the inner race 80 and may be selected based on the manufacturing tolerances used for forming each component. The clearance $C_2$ may be about 30 microns, as one non-limiting example. However, it is understood, the clearance $C_2$ can be greater than or less than 30 microns, if desired.

The clearance $C_2$ between the outer surface 94 of the ball cage engaging portion 91 of the inner race 80 and the first portion 71 of the inner surface 66 of the ball cage 50 allows for the ball cage engaging portion 91 of the inner race 80 to be axially inserted into the bore 64 of the ball cage 50 when the second central axis 51 is aligned with the third central axis 81. The ball cage engaging portion 91 of the inner race 80 is axially inserted into the bore 64 of the ball cage 50 until the spherically contoured outer surface 94 abuts the spherically contoured second portion 72 of the inner surface 66 of the ball cage 50. The existence of the clearance $C_2$ allows for the outer surface 94 of the ball cage engaging portion 91 of the inner race 80 to nest in the second portion 72 of the inner surface 66 of the ball cage 50. The clearance $C_2$ also allows for enough clearance for the inner race 80 to be rotated in a direction (represented by the dashed arrow) about an axis perpendicular to the third central axis 81 of the inner race 80. For example, the inner race 80 may be rotated about the third joint center point 95 as viewed from the perspective of FIG. 3. As a result, the clearance $C_2$ is maintained between the outer surface 94 of the ball cage engaging portion 91 of the inner race 80 and the second portion 72 of the inner surface 66 of the ball cage 50 without having to alter the axial position of the third joint center point 95 of the inner race 80 relative to the ball cage 50.

In the embodiment shown, the inner race 80 further includes an axially extending shaft portion 99 extending away from the ball cage engaging portion 91 of the inner race 80. The shaft portion 99 is substantially cylindrical in shape and extends parallel to the third central axis 81. The shaft portion 99 may be configured to engage a component to which rotational motion of the CV joint assembly 10 is transferred, typically via a spline interface, during use thereof.

The shape and configuration of each of the outer race 20, the ball cage 50, and the inner race 80 facilitates a simplified method of assembling the CV joint assembly 10. As explained hereinabove, the existence of the clearance $C_1$ between the cylindrical first portion 41 of the inner surface 36 of the outer race 20 and the spherically contoured outer surface 57 of the ball cage 50 allows for a simplified axial insertion of the ball cage 50 into the bore 34 of the outer race 20. The ball cage 50 is inserted axially until the second joint center point 65 of the ball cage 50 coincides with the first joint center point 45 of the outer race 20. When in this position, the ball cage 50 may be rotated about the joint center points 45, 65 without the joint center points 45, 65 separating due to the spherical contour of each of the second portion 42 of the inner surface 36 of the outer race 20 and the outer surface 57 of the ball cage 50.

In a similar fashion, the clearance $C_2$ present between the ball cage 50 and the inner race 80 also allows for the ball cage engaging portion 91 of the inner race 80 to be axially inserted into the bore 64 of the ball cage 50 until the joint center points 55, 85 coincide. The inner race 80 is then able to be rotated relative to the ball cage 50 without separating the joint center points 55, 85 from each other.

The use of the bores 34, 64 having both cylindrical portions and spherically contoured portions accordingly facilitates a simplified axial insertion of the ball cage 50 into the outer race 20 and the inner race 80 into the ball cage 50 while also providing a stopping mechanism for establishing an axial position of each of the outer race 20, the ball cage 50, and the inner race 80 relative each other. The stopping mechanism having a spherical contour further allows for each of the outer race 20, the ball cage 50, and the inner race 80 to be rotated relative to the coinciding joint center points 45, 65, 95 without requiring an axial repositioning of any one of the outer race 20, the ball cage 50, and the inner race

80. This relationship allows for an ease of manufacture of the CV joint assembly 10 in comparison to an assembly having components with only cylindrical surfaces or only spherical surfaces in engagement with each other.

In the embodiment shown, each of the outer race 20 and the ball cage 50 is disclosed as including the inner surfaces 36, 66 having both the cylindrical and the spherical contour, and each of the ball cage 50 and the inner race 80 is disclosed as having the outer surfaces 57, 94 with a complimentary spherical contour. However, it should also be understood that some embodiments of the present disclosure may include only the outer race 20 and the ball cage 50 having such a relationship present therebetween or only the ball cage 50 and the inner race 80 having such a relationship present therebetween, as desired. As such, the interaction of a spherical outer surface contacting an inner surface having both a cylindrical and a spherical contour may only be present at one junction of the aforementioned components as opposed to two junctions of the aforementioned components.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An axially fixed constant velocity joint assembly comprising:
    an outer race having ball tracks and a first bore defined by an inner surface of the outer race, the outer race including a first central axis, a first joint center plane arranged perpendicular to the first central axis, and a first joint center point disposed at an intersection of the first central axis and the first joint center plane; and
    a ball cage having an outer surface and a second bore defined by an inner surface of the ball cage, the ball cage axially received in the first bore of the outer race, the ball cage including a second central axis, a second joint center plane arranged perpendicular to the second central axis, and a second joint center point disposed at an intersection of the second central axis and the second joint center plane;
    wherein the constant velocity joint assembly includes one or both of:
        the inner surface of the outer race includes a first portion having a cylindrical contour and a second portion having a spherical contour, the first portion of the inner surface of the outer race intersecting the second portion of the inner surface of the outer race along the first joint center plane of the outer race; and/or
        the inner surface of the ball cage includes a first portion having a cylindrical contour and a second portion having a spherical contour, the first portion of the inner surface of the ball cage intersecting the second portion of the inner surface of the ball cage along the second joint center plane of the ball cage.

2. The constant velocity joint assembly of claim 1, further comprising an inner race having an outer surface, the inner race axially inserted into the second bore of the ball cage, at least one of the outer surface of the inner race or the outer surface of the ball cage having a spherical contour.

3. The constant velocity joint assembly of claim 2, wherein the first joint center point of the outer race aligns with the second joint center point of the ball cage and a third joint center point of the inner race, and wherein the first joint center point, the second joint center point, and the third joint center point remain aligned with each other as any one of the outer race, the ball cage, and the inner race rotate about a respective one of the first joint center point, the second joint center point, and the third joint center point.

4. The constant velocity joint of claim 1, wherein the first portion of the inner surface of the outer race is arranged tangential to the second portion of the inner surface of the outer race where the first portion of the inner surface of the outer race intersects the second portion of the inner surface of the outer race.

5. The constant velocity joint of claim 1, wherein the first portion of the inner surface of the ball cage is arranged tangential to the second portion of the inner surface of the ball cage where the first portion of the inner surface of the ball cage intersects the second portion of the inner surface of the ball cage.

6. An axially fixed constant velocity joint assembly comprising:
    an outer race having ball tracks and a first bore defined by an inner surface of the outer race, the inner surface including a first portion having a cylindrical contour and a second portion having a spherical contour, the outer race including a first central axis extending through the first bore, a first joint center plane arranged perpendicular to the first central axis, and a first joint center point disposed at an intersection of the first central axis and the first joint center plane;
    a ball cage having an outer surface and a second bore defined by an inner surface of the ball cage, the ball cage axially received in the first bore of the outer race, the ball cage including a second central axis extending through the second bore, a second joint center plane arranged perpendicular to the second central axis, and a second joint center point disposed at an intersection of the second central axis and the second joint center plane, the outer surface of the ball cage having a spherical contour and the inner surface of the ball cage including a first portion having a cylindrical contour and a second portion having a spherical contour, the first portion of the inner surface of the ball cage intersecting the second portion of the inner surface of the ball cage along the second joint center plane; and
    an inner race having an outer surface with a spherical contour, the inner race axially received in the second bore of the ball cage, the inner race including a third central axis extending axially therethrough, a third joint center plane arranged perpendicular to the third central axis, and a third joint center point disposed at an intersection of the third central axis and the third joint center plane.

7. The constant velocity joint assembly of claim 6,
    wherein the first central axis, the second central axis, and the third central axis align with each other when the ball cage is axially received in the outer race and the inner race is axially received in the ball cage, and
    wherein the first joint center plane, the second joint center plane, and the third joint center plane align with each other when the ball cage is axially received in the outer race and the inner race is axially received in the ball cage.

8. The constant velocity joint assembly of claim 7,
    wherein the first portion of the inner surface of the outer race has a substantially constant first radial distance along a direction of the first central axis, and wherein the first radial distance is measured from the first portion of the inner surface of the outer race to the first central axis in a direction perpendicular to the first central axis.

9. The constant velocity joint assembly of claim 8,
wherein the second portion of the inner surface of the outer race has a substantially constant second radial distance along the direction of the first central axis,
wherein the second radial distance is measured from the second portion of the inner surface of the outer race to the first joint center point, and
wherein the first radial distance is equal to the second radial distance.

10. The constant velocity joint assembly of claim 9,
wherein the inner surface of the outer race further includes a third portion having a cylindrical contour, and
wherein the second portion of the inner surface of the outer race is disposed intermediate the first portion of the inner surface of the outer race and the third portion of the inner surface of the outer race.

11. The constant velocity joint assembly of claim 10,
wherein the third portion of the inner surface of the outer race has a substantially constant third radial distance along the direction of the first central axis,
wherein the third radial distance is measured from the third portion of the inner surface of the outer race to the first central axis in a direction perpendicular to the first central axis, and
wherein the third radial distance is less than the first radial distance and the second radial distance.

12. The constant velocity of joint assembly of claim 11,
wherein the outer surface of the ball cage has a substantially constant fourth radial distance along a direction of the second central axis,
wherein the fourth radial distance is measured from the outer surface of the ball cage to the second joint center point, and
wherein the fourth radial distance is less than the first radial distance and the second radial distance.

13. The constant velocity joint assembly of claim 12,
wherein the first portion of the inner surface of the ball cage has a substantially constant fifth radial distance along a direction of the second central axis,
wherein the fifth radial distance is measured from the first portion of the inner surface of the ball cage to the second central axis in a direction perpendicular to the second central axis,
wherein the second portion of the inner surface of the ball cage has a substantially constant sixth radial distance along the direction of the second central axis, and
wherein the sixth radial distance is measured from the second portion of the inner surface of the ball cage to the second joint center point.

14. The constant velocity joint assembly of claim 13, wherein the fifth radial distance is equal to the sixth radial distance.

15. The constant velocity joint assembly of claim 14,
wherein the inner surface of the ball cage includes a third portion having a substantially cylindrical contour, the second portion of the inner surface of the ball cage disposed intermediate the first portion of the inner surface of the ball cage and the third portion of the inner surface of the ball cage,
wherein the third portion of the inner surface of the ball cage has a substantially constant seventh radial distance along the direction of the second central axis,
wherein the seventh radial distance is measured from the third portion of the inner surface of the ball cage to the second central axis in a direction perpendicular to the second central axis, and
wherein the seventh radial distance is less than the fifth radial distance and the sixth radial distance.

16. The constant velocity joint assembly of claim 14,
wherein the outer surface of the inner race has a substantially constant eighth radial distance along a direction of the third central axis,
wherein the eighth radial distance is measured from the outer surface of the inner race to the third joint center point, and
wherein the eighth radial distance is slightly less than the fifth radial distance and the sixth radial distance.

17. The constant velocity joint assembly claim 16,
wherein the first joint center point, the second joint center point, and the third joint center point remain aligned when the outer race, the ball cage, and the inner race rotate with respect to each other about an axis extending through the respective one of the first joint center point, the second joint center point, and the third joint center point, and
wherein the axis extends perpendicular to each of the first central axis, the second central axis, the third central axis.

18. An axially fixed constant velocity joint assembly comprising:
an outer race having ball tracks and a first bore defined by an inner surface of the outer race, the inner surface including a first portion having a cylindrical contour and a second portion having a spherical contour, wherein a first end of the second portion of the inner surface of the outer race is angularly displaced from a second end of the second portion of the inner surface of the outer race by a first angle in a range of about 10 to 20 degrees;
a ball cage having an outer surface and a second bore defined by an inner surface of the ball cage, the ball cage axially inserted into the first bore of the outer race, the outer surface of the ball cage nests within the second portion of the inner surface of the outer race, wherein a substantially equal first clearance is formed intermediate the outer surface of the ball cage and the first portion of the inner surface of the outer race and the outer surface of the ball cage and the second portion of the inner surface of the outer race, the inner surface of the ball cage including a first portion having a cylindrical contour and a second portion having a spherical contour; and
an inner race having an outer surface, the inner race nests within the second portion of the inner surface of the ball cage, wherein a substantially equal second clearance is formed intermediate the outer surface of the inner race and the first portion of the inner surface of the ball cage and the outer surface of the inner race and the second portion of the inner surface of the ball cage.

19. The constant velocity joint assembly of claim 18,
wherein the outer surface of the ball cage has a substantially spherical contour, and
wherein a first end of the outer surface of the ball cage is angularly displaced from a second end of the outer surface of the ball cage by a second angle in the range of the about 40 to 60 degrees.

20. The constant velocity joint assembly of claim 19, wherein a first end of the second portion of the inner surface of the ball cage is angularly displaced from a second end of the second portion of the inner surface of the ball cage by a third angle in the range of about 10 to 30 degrees.

\* \* \* \* \*